United States Patent

Suzuki et al.

[11] Patent Number: 5,814,569
[45] Date of Patent: Sep. 29, 1998

[54] UNIAXIALLY ELASTIC NONWOVEN FABRIC

[75] Inventors: Migaku Suzuki; Hiroaki Fukui, both of Tokyo; Yoshihiko Mineda, Kyoto; Koichi Nagaoka, Kyoto; Michiyo Iimi, Kyoto, all of Japan

[73] Assignees: Unitika Ltd., Hyogo; Japan Absorbent Technology Institute, Tokyo, both of Japan

[21] Appl. No.: 828,037

[22] Filed: Mar. 27, 1997

[30] Foreign Application Priority Data

Mar. 27, 1996 [JP] Japan .................................. 8-099342
Aug. 23, 1996 [JP] Japan .................................. 8-241025

[51] Int. Cl.$^6$ .................................................... D06C 3/00
[52] U.S. Cl. .................... 442/328; 156/62.6; 156/209; 156/229; 156/296; 156/308.2; 156/308.4; 264/284.4; 264/288.8; 264/290.5; 428/910; 428/373; 442/329; 442/364; 442/394; 442/401; 442/409; 442/411
[58] Field of Search .................... 442/328, 329, 442/394, 364, 401, 409, 411; 428/910, 373; 156/62.6, 229, 209, 296, 308.2, 308.4; 264/290.5, 284.4, 288.8

[56] References Cited

U.S. PATENT DOCUMENTS 5,244,482  9/1993  Hassenboehler et al. ................ 55/528
5,498,468  3/1996  Blaney ..................................... 442/364
5,540,976  7/1996  Shawver et al. ........................ 442/364
5,540,992  7/1996  Marcher et al. ........................ 428/910

*Primary Examiner*—James J. Bell
*Attorney, Agent, or Firm*—Jones, Tullar & Cooper, P.C.

[57] ABSTRACT

A nonwoven fabric of superior uniaxial elasticity is provided. The nonwoven fabric comprises of conjugate filaments each of which is about concentric sheath-core type. Core component is composed of polyester and sheath component is composed of polyolefine. In the nonwoven fabric, heat bonded areas are interspersed by heat bonding the conjugate filaments one another by softening or melting the sheath component. The nonwoven fabric satisfies following four properties concurrently: (i) breaking elongation in cross direction is 150% or more, (ii) ratio of breaking elongation in cross direction to breaking elongation in machine direction is 5 or more, (iii) percentage of elastic recovery at the time of extending the nonwoven fabric by 50% in cross direction is 60% or more, and (iv) percentage of elastic recovery at the time of extending the nonwoven fabric by 100% in cross direction is 50% or more. A heat is partially applied to a filamentous web, thereby obtaining a filamentous fleece. The filamentous fleece is extended in cross direction and a heat drawing is applied to the filamentous fleece at a drawing ratio of 10 to 80% in machine direction, and a heat setting is applied to the filamentous fleece, thereby an elastic nonwoven fabric is obtained.

7 Claims, 1 Drawing Sheet

UNIAXIALLY ELASTIC NONWOVEN FABRIC

BACKGROUND OF THE INVENTION

1. Field of the Invention

The present invention relates to a nonwoven fabric of superior uniaxial elasticity and to a manufacturing process thereof.

2. Prior Art

Hitherto, nonwoven fabrics have been applied in various uses such as clothing, industrial material, civil work material, agricultural or horticultural material, living material, medical or healthy material, etc. Among others, particularly in the nonwoven fabrics for use in medical or healthy material such as surface material of a disposable diaper, cloth of poultice, supporter for sporting use or bandage, elasticity is an essential requirement to follow or fit the movement of human body. As a method for giving the elasticity to the nonwoven fabric, (1) it has been conventionally known to use either crimped fibers or filaments of sufficient elasticity or (2) polyurethane fibers or filaments and the like which are elastic in itself.

There have been proposed several technologies coming under the former method (1) as follows. For example, the Japanese Laid-Open Patent Publication (Unexamined) No. Sho 63-28,960 discloses an elastic nonwoven fabric obtained by the steps of applying an entanglement by a water-needling to a web of staple fibers which have latent crimpability, and manifesting the latent crimpability by a heat treatment. The Japanese Laid-Open Patent Publication (Unexamined) No. Hei 2-91,217 discloses an elastic nonwoven fabric obtained by the steps of applying a needle punching to a web of staple fibers which have latent crimpability, and manifesting the latent crimpability by a heat treatment. The Japanese Patent Publication (Examined) No. Hei 4-46,145 discloses an elastic nonwoven fabric obtained by a spinning process comprising the steps of applying a one-side cooling to filaments of modified cross-section, giving crimps or latent crimpability to a filament by the strain caused on the cooling, and forming the filaments into the nonwoven fabric. The Japanese Patent Publication (Examined) No. Hei 4-46147 discloses an elastic nonwoven fabric obtained by the steps of applying a heat treatment to a filamentous web formed by accumulating side-by-side type conjugate filaments or eccentric sheath-core type conjugate filaments which are composed of two polymers of different heat shrinkage, and causing the filaments to manifest crimps by the different heat shrinkage.

As a technology coming under the latter method (2), the Japanese Laid-Open Patent Publication (Unexamined) No. Sho 59-223347 discloses an elastic nonwoven fabric formed of thermoplastic polyurethane elastic fibers or filaments. In any of the mentioned known technologies, the nonwoven fabric is composed of elastic fibers or filaments.

There have been also proposed other nonwoven fabrics of which the elasticity is performed principally due to the structure of the nonwoven fabric, instead of using any elastic fibers or filaments to form the nonwoven fabric. For example, a nonwoven fabric is known, which is obtained by apllying the binder as elastic rubber to a web formed of staple fibers principally arranged in one direction (machine direction). In case of this nonwoven fabric, the elasticity is exhibited in cross direction, to a certain extent, by cooperative function between the orientation of staple fibers and the elasticity of the binder. Such orientation of the staple fibers may be easily achieved by combing and piling according to a carding method. In this nonwoven fabric, however, there is a disadvantage of insufficient breaking strength because this nonwoven fabric is formed of a staple fibers.

To cope with this, it may be an idea to orient filaments in machine direction in the nonwoven fabric obtained by spunbond process, etc. To orient the filaments in machine direction by the conventional spunbond process, it becomes necessary to the drawing speed in melt spinning to the moving speed of collecting conveyor. However, this is difficult in view of the manufacturing process. More specifically, the drawing speed in melt spinning is no less than several thousands m/min., while the moving speed of the collecting conveyor is more or less several hundreds m/min at maximum. Therefore, it is difficult to adjust this to that. It is also possible to obtain a nonwoven fabric in which filaments are oriented in machine direction by a process comprising the steps of forming the filaments by melt spinning, collecting the filaments into a tow, and opening the tow. However, this process is excessively complicated and is not reasonable.

Moreover, there is another disadvantage in those, when the fibers or filaments are collected on the conveyor to be oriented in machine direction, points (bonding points) where the fibers or filaments contact one another are less than the case of random orientation. As a result, the nonwoven fabric is insufficient in breaking strength in cross direction.

U.S. Pat. No. 5,244,482 discloses a process for manufacturing a nonwoven fabric comprising the steps of preparing a filamentous fleece obtained principally by melt-blown method and in which filaments are oriented at random, and the filaments being oriented in machine direction by applying a heat drawing to the fleece, thereby obtaining a nonwoven fabric having elasticity in cross direction. There arises, however, a disadvantage in that, since the filaments used in this patented process are those of mono-component, when heat bonding those filaments one another, each form of the filaments is collapsed at the heat bonded portions. As a result, it is difficult to obtain an elastic nonwoven fabric having sufficient breaking strength. There is another disadvantage in that since the filaments obtained by melt-blown method are small in diameter (having small denier), it is difficult to obtain an elastic nonwoven fabric of sufficient breaking strength. Moreover, it is certain that the nonwoven fabric obtained by this patented process has a desirable elasticity in cross direction, but the size of pores formed among the filaments is reduced, as a result, the nonwoven fabric has high density (small percentage of porosity). More specifically, it is described in this U.S. Pat. No. 5,244,482 that the size of pores formed among the filaments in the obtained elastic nonwoven fabric becomes to be 80% or less as compared with the size of pores formed among the filaments of the filamentous fleece. Depending upon way of use, there may be no problem in such elastic nonwoven fabric having reduced porosity, i.e., small percentage of, porosity and low breaking strength. For example, when using this nonwoven fabric as a filtration medium for filtering fine dust, there is no problem. However, in the other uses, particularly when this elastic nonwoven fabric is used as medical or healthy materials such as surface material of diaper, cloth of poultice, supporter for sporting use, or bandage, etc., the mentioned low percentage of porosity and low tensile strength may bring about some undesirable results. That is, the elastic nonwoven fabric of small percentage having porosity is deficient in gas permeability and, therefore, when using this nonwoven fabric as a supporter for sporting use or the like, there is a disadvantage of difficulty to vapor a sweat, thereby giving an uncomfortable feeling to the user. Further, this elastic nonwoven fabric is also deficient in liquid permeability and, therefore, when using this nonwoven fabric as a surface material of disposable diaper, there arises a disadvantage that it is difficult for body fluid (urine, etc.) to permeate into the absorbing member in the disposable diaper, as a result, in leak of the body fluid leaks out. There may be a further disadvantage of breaking due to low breaking strength.

SUMMARY OF THE INVENTION

Accordingly, an object of the present invention is to provide a nonwoven fabric which has a structure of easily performing uniaxial elasticity and has a desired percentage of porosity and tensile strength. Such a nonwoven fabric was successfully made by the inventors by applying a specific heat drawing to a filamentous fleece formed by the conventional spunbond process and in which filaments are accumulated relatively at random, said filaments being conjugate filaments each of which is about concentric sheath-core type, and in which heat bonded areas are interspersed.

Several technologies for applying a heat drawing to a filamentous fleece formed by the conventional spunbond process and provided with heat bonded areas have been disclosed in the Japanese Patent Publication (Examined) No. Sho 57-54,583 and the Japanese Laid-Open Patent Publication (Unexamined) No. Hei 2-33369. These prior technologies, however, are definitely different from the present invention in the aspects that they do not intend to perform an elasticity which is an object of the invention. More specifically, an object of the mentioned prior arts is to obtain a nonwoven fabric of, good feeling and superior drapability and, for this object, a filamentous fleece is formed of non-drawn filaments having low degree of crystallinity and low degree of orientation, and a heat drawing is applied to this filamentous fleece so that the non-drawn filaments may be transformed into filaments of high degree of crystallinity and high degree of orientation. In other words, they are technologies that the filaments of the filamentous fleece are transformed into filaments of good physical property after obtaining the filamentous fleece. Further, in both of the two technologies, non-conjugate type filaments of mono-component are used and, therefore, it is difficult to control the heat bonding temperature at the time of forming the filamentous fleece. More specifically, if the temperature is high at the time of heat bonding, each form of the filaments is completely collapsed in the heat bonded areas, and the heat bonded areas are holed or broken by the heat drawing. On the other hand, if the temperature is low at the time of heat bonding, the heat bonding becomes incomplete and the form of the nonwoven fabric itself is collapsed by the heat drawing.

It is certain that, in the invention, a heat drawing is applied to a filamentous fleece in the same manner as the foregoing two prior technologies, but the invention is different from the foregoing two prior technologies in the aspect that an object of the invention is to achieve a nonwoven fabric of superior elasticity, and in the aspect that conjugate filaments each of which is about concentric sheath-core type are used in the invention. Likewise, with respect to the manufacturing process, there are differences between the invention and the mentioned two prior technologies in the aspect of extending the filamentous fleece in cross direction before applying the heat drawing when required, and in the aspect of applying a heat setting after the heat drawing.

Accordingly, the uniaxially elastic nonwoven fabric according to the present invention comprises: accumulated conjugate filaments each of which is about concentric sheath-core type being composed of a polyester core component and a polyolefine sheath component of lower melting point than that of said polyester core component, and heat bonded areas being interspersed by heat bonding said conjugate filaments each other by softening or melting said sheath component; wherein breaking elongation of the uniaxially elastic nonwoven fabric in cross direction is 150% or more, and ratio of breaking elongation in cross direction to breaking elongation in machine direction is 5 or more; and wherein percentage of elastic recovery at the time of extending the uniaxially elastic nonwoven fabric by 50% in cross direction is 60% or more, and percentage of elastic recovery at the time of extending the uniaxially elastic nonwoven fabric by 100% in cross direction is 50% or more.

The manufacturing process of the uniaxially elastic nonwoven fabric according to the invention comprising the steps of: forming a filamentous web by accumulating conjugate filaments on a collecting conveyor, each of which is about concentric sheath-core type being composed of a polyester core component and a polyolefine sheath component of lower melting point than that of said polyester core component; applying a heat partially to said filamentous web, thereby obtaining a filamentous fleece in which heat bonded areas, formed by heat bonding said conjugate filaments each other by softening or melting said sheath component, are interspersed; applying a heat drawing to said filamentous fleece at a drawing ratio of 10 to 80% in machine direction while extending said filamentous fleece in cross direction at a percentage of extension of 0 to 50%; and applying a heat setting to said filamentous fleece at a temperature lower than melting point of said sheath component.

The uniaxially elastic nonwoven fabric according to the invention is composed of the conjugate filaments each of which is about concentric sheath-core type. The polyester polymer constitutes the component, and the polyolefine polymer of lower melting point than that of said polyester polymer, constitutes the sheath component. The "about concentric sheath-core type" means that the core component and the sheath component are about concentric, and not eccentric sheath-core type. In the conjugate filaments each of which is eccentric sheath-core type, when applying a heat, crimps take place easily because of difference in heat shrinkage percentage between the polyester polymer and the polyolefine polymer and, therefore, it is not preferable to use such conjugate filaments each of which is eccentric sheath-core type. In this sense, it is to be understood that, even if the conjugate filament is slightly eccentric sheath-core type, and consists of any polyester polymer and polyolefine polymer of which heat shrinkage percentage is different from each other, as far as no crimps take place at the time of heat treatment, "about concentric sheath-core type" covers the mentioned slightly eccentric sheath-core type. In addition, there is no problem if a small amount of filaments or fibers other than the conjugate filaments each of which is about concentric sheath-core type are mixed in the uniaxially elastic nonwoven fabric according to the invention.

Polyethyleneterephthalate is used as the polyester polymer. Furthermore, polyester in which principal repetition unit (mer unit) is ethyleneterephthalate is used as the polyester polymer. In the case of using the latter polyester, the ethyleneterephthalate unit is preferably at least 85 mol % or more. Any conventionally known acid component and/or alcohol component may be used as the component other than the ethyleneterephthalate unit. Isophthalic acid, adipic acid or the like may be used as the acid component. Propylene glycol, diethylene glycol or the like may be used as the alcohol component.

Linear low density polyethylene, high density polyethylene, medium density polyethylene, low density polyethylene, polypropylene, ethylene-vinyl acetate copolymer, etc. may be used as the polyolefine polymer.

When required, various additives such as delustering agent, pigment, light stabilizer, heat stabilizer, antioxidant, crystallization accelerator, etc. may be added to the polyester polymer or the polyolefine polymer without departing from the object of the invention.

It is preferred that fineness (size) of the conjugate filament which is about concentric sheath-core type is 15 denier or less. If exceeding 15 denier, rigidity of the filament is increased and hard feeling of the uniaxially elastic nonwoven fabric is also increased, therefore it is difficult to use the nonwoven fabric in various uses. In this regard, the fineness of the conjugate filaments each of which is about concentric sheath-core type mentioned herein means the fineness of the conjugate filament in the obtained nonwoven fabric, and so the conjugate filament in the filamentous fleece before the drawing may be a little larger (for example, to about 18 denier) than 15 denier. However, if the conjugate filament in the filamentous fleece are exceeding 15 denier largely, there may be a problem in cooling solidification of the filament in the melt spinning process, and productivity tends to come down in the drawing step of the filamentous fleece.

With respect to weight ratio between the core component and the sheath component in the conjugate filament which is about concentric sheath-core type, the sheath component is preferably 0.1 to 5 weight parts, more preferably, 0.2 to 4 weight parts on the basis of 1 weight part of the core component. Since the sheath component is an agent for heat bonding the conjugate filaments one another in the heat bonded areas, if the weight be ratio thereof is less than 0.1 weight part, the heat bonding is insufficient and tensile strength of the nonwoven fabric may be reduced. Moreover, in the step of applying the heat drawing to the filamentous fleece, there is a possibility that the heat bonded areas are broken, as a result, the conjugate filaments slip out of the heat bonded areas. On the other hand, if the sheath component exceeds 5 weight parts, the heat bonding takes place excessively in the heat bonded areas, percentage of the portions keeping the form of filaments in the heat bonded areas decreases, and there is a possibility that the heat bonded areas are holed at the time of heat drawing.

In the uniaxially elastic nonwoven fabric according to the invention, there are a large number of heat bonded areas in which the conjugate filaments are heat bonded one another. In the heat bonded areas, the conjugate filaments are heat bonded one another by softening or melting the sheath components, and the core components exist generally keeping the initial filamentous form otherwise in the filamentous form deformed a little, without softening or melting. Each individual form of the heat bonded areas is, for example, circle, ellipse, rhomboid, triangle, T-shape, #-shape; rectangle, etc. The heat bonded areas, however, may be not always distinct but indistinct to a certain extent. This is because the heat bonded areas may be distorted due to the heat drawing. The size of each individual heat bonded area is preferably about 0.2 to 6.0 $mm^2$. The distance between the heat bonded areas adjacent each other is about 0.3 to 2.0 mm at the shorter portions while being 1 to 10 mm at the longer portions. Total area of the heat bonded areas is preferably about 2 to 50% of the surface area of the nonwoven fabric and, more preferably, 5 to 25%.

The uniaxially elastic nonwoven fabric according to the invention has specific physical properties, i.e., satisfies the following four properties simultaneously. In the first property, breaking elongation of the nonwoven fabric in cross direction must be 150% or more. If the breaking elongation is less than 150%, the elasticity of the nonwoven fabric in cross direction is insufficient and any desired elasticity cannot be performed. In the second property, ratio of the breaking elongation of the nonwoven fabric in cross direction to the breaking elongation of the nonwoven fabric in machine direction must be 5 or more. If the ratio is less than 5, the elasticity in cross direction is not remarkably high as compared with that in machine direction, and such a nonwoven fabric may not be said "uniaxially elastic". In this regard, the breaking elongation (%) was measured in accordance with the method set forth in JIS-L-1096A. More specifically, ten test strips of 5 cm in width were prepared, and each test strip was tensioned by Tensilon UTM-4-1-100 (produced by Toyo Baldwin) on the conditions of 5 cm in distance between chucks and 10 cm/min. in tensile speed, and average elongation at the time that each test strip was broken was deemed the breaking elongation (%). Accordingly, the breaking elongation may be calculated by the expression of "breaking elongation (%)={[(distance between chucks (cm) at the time that each test strip was broken)–(5)]/(5)}×100". It is a matter of course that the breaking elongation of the nonwoven fabric in cross direction is measured by tensioning each test strip in such a manner that the longitudinal direction of each test strip coincides with the cross direction of the nonwoven fabric, while the breaking elongation of the nonwoven fabric in machine direction is measured by tensioning each strip in such a manner that the longitudinal direction of each strip coincides with the machine direction of the nonwoven fabric.

In the third property, percentage of elastic recovery at the time of extending the nonwoven fabric by 50% in cross direction must be 60% or more. If the percentage of elastic recovery is less than 60%, shrinkage obtained after extending the nonwoven fabric in cross direction by applying some external force and releasing the external force is insufficient to perform a desired elasticity. In the forth property, percentage of elastic recovery at the time of extending the nonwoven fabric by 100% in cross direction must be 50% or more. If the percentage of elastic recovery is less than 50%, any sufficient elasticity is not performed. Each percentage of elastic recovery was measured in the following manner in accordance with the method set forth in JIS-L-1,096 6.13. 1A. First, five test strips of 5 cm in width were prepared. It is to be noted that the longitudinal direction of each strip test piece coincides with the cross direction of the nonwoven fabric. Each strip was tensioned by Tensilon UTM-4-1-100 (produced by Toyo Baldwin) on the conditions of 5 cm in distance between chucks and 10 cm/min. in tensile speed, and the tensioning was stopped at the moment when percentage of elongation has come to 50% (at the moment when the distance between chucks comes to 5×1.5 cm) or 100% (at the moment when the distance between chucks comes to 5×2 cm). Then, each strip was taken out of the Tensilon UTM-4-1-100 and left for a while (to be concrete, until recovery of the strip cannot be watched), and a length L cm of each strip grasped by chucks was measured after each strip has shrunk. The percentage of elastic recovery at the time of elongating 50% was calculated by the expression of $[(5 \times 1.5 - L)/(5 \times 1.5 - 5)] \times 100$. Likewise the percentage of elastic recovery at the time of elongating 100% was calculated by the expression of $[(5 \times 2 - L)/(5 \times 2 - 5)] \times 100$.

Percentage of porosity in the elastic nonwoven fabric according to the invention is preferably 85% or more and, more preferably, 90% or more. In the invention, it is possible to obtain an elastic nonwoven fabric without substantially reducing the percentage of porosity, and even if the percentage of porosity in the filamentous fleece (which is a precursor for obtaining the elastic nonwoven fabric) is less than 85%, the percentage of the porosity in the obtained elastic nonwoven fabric is 85% or more. If the percentage of porosity is less than 85%, size of the pores formed among the filaments becomes too small to utilize the obtained elastic nonwoven fabric in various uses. For example, when such an elastic nonwoven fabric is used for a medical or healthy material, there is a disadvantage that the vaporization of sweat or the permeability of body fluids is insufficient. The percentage of porosity (%) in the elastic nonwoven fabric may be calculated by the expression of $[1-(w/tS\rho)]\times 100$ (%); where S indicates an area ($cm^2$) of the nonwoven fabric, t indicates a thickness (cm) of the nonwoven fabric, $\rho$ indicates a density ($g/cm^3$) of the filament forming the nonwoven fabric, and w indicates a weight ($g/cm^2$) of the nonwoven fabric of area S. In addition, the measurement of the thickness was carried out under applying a load of 4.5 $g/cm^2$ to the nonwoven fabric.

Birefringence ($\Delta n$) of the filament (core component) forming the core of the conjugate filament used in the invention is preferably $100\times 10^{-3}$ or more and, more preferably, $115\times 10^{-3}$ or more. For example, even when the birefringence $\Delta n$ of polyester being the core component of the filament forming the filamentous fleece is $90\times 10^{-3}$, the birefringence is improved to the extent of $\Delta n=100\sim 120\times 10^{-3}$ by drawing the filamentous fleece. And the tensile strength in machine direction of the obtained elastic nonwoven fabric is improved by 1.4 times as much as the tensile strength in machine direction of the filamentous fleece. The birefringence ($\Delta n$) is obtained by reading a difference between the refraction factor in parallel to the axis of the filament and that in perpendicular to the axis of the filament, using a polarization microscope. If the birefringence ($\Delta n$) is less than $100\times 10^{-3}$, molecular orientation in axial direction of the core component is insufficient, as a result, the tensile strength of the elastic nonwoven fabric is reduced. In this regard, birefringence of the sheath component may be of no value, because the original form of the sheath component is collapsed in the heat bonded areas and there is no substantial influence on the tensile strength of the elastic nonwoven fabric.

The tensile strength of the elastic nonwoven fabric according to the invention is preferably 35 kg/5 cm width or more in machine direction. If the tensile strength is lower in value than this, there is a possibility of breaking when such a nonwoven fabric is applied for any use in which a relatively large external force is loaded. The tensile strength is measured by the same method as the breaking strength, and a load at the time when each test strip is broken is measured and average value of the load is converted on the basis of 100 $g/m^2$ (weight per square meter), and the converted value is deemed to be the tensile strength.

Value of total hand of the elastic nonwoven fabric according to the invention is preferably 2.5 $g/g/m^2$ or less and, more preferably, 2.0 $g/g/m^2$ or less. If the value of total hand exceeds 2.5 $g/g/m^2$, the flexibility of the elastic nonwoven fabric is insufficient. Particularly when the elastic nonwoven fabric according to the invention is used for a medical or healthy material applied to human body, it is preferred to use an elastic nonwoven fabric of which the value of total hand is not more than 2.5 $g/g/m^2$. The value of total hand is obtained by dividing a value measured in accordance with the method of handle-O-meter set forth in JIS L-1096 by a weight per square meter ($g/m^2$).

The nonwoven fabric of sufficient elasticity according to the invention may be produced in the following manner. First, a polyester polymer and a polyolefin polymer are prepared. The two polymers are respectively introduced in a bi-component melt spinning apparatus, and each of them is introduced in spinnerets each of which is provided with holes to spin bi-component filaments. At this time, it is intended that the molten polyester polymer is introduced in the core part of the hole to spin bi-component filament, while the molten polyolefin polymer is introduced in the sheath part of the hole to spin bi-component filament. Then, conjugate filaments each of which is about concentric sheath-core type are spun out of the spinnerets. The spun filaments are then cooled by a conventional cooling system. The cooled filaments are drawn and fined to reach a target size or fineness by air sucker method or Docan method. In this step, the drawing speed is preferably 3,000 m/min or more and, most preferably, 3,500 m/min. As a result of such a high speed drawing, it becomes possible to obtain the conjugate filaments each of which is about concentric sheath-core type having a core component with high degree of crystallinity, high degree of orientation, and high degree of birefringence, as compared with those disclosed in the Japanese Laid-Open Patent Publication (Unexamined) No. Hei 2-33,369. For example, the birefringence of the core component ($\Delta n$) of the obtained conjugate filament is $50\sim 100\times 10^{-3}$ or more. If the birefringence of the core component is less than this, the core component becomes structurally unstable. As a result, it is very difficult to make a temperature control at the time when a heat bonding is applied to the filamentous webs composed of such filaments or at the time when a heat drawing is applied to the filamentous fleece. Moreover, shrinkage due to heat is very large, and physical properties of the obtained nonwoven fabric are considerably reduced. The breaking elongation of the filament obtained by the mentioned high speed drawing is largely reduced to be about 150%, as compared with that of the filament disclosed in the Japanese Laid-Open Patent Publication (Unexamined) No. Hei 2-33369.

The drawn and fined conjugate filaments each of which is about concentric sheath-core type are filament-opened by the conventional method such as corona discharge or frictional electrification, and then accumulated on the moving conveyor as a moving wire mesh screen conveyor, whereby filamentous web is formed. A heat is applied partially to the filamentous web. Then, at the portions to which a heat has been applied, only the sheath components of the conjugate filaments are softened or molten, heat bonded areas in each of which are heat bonded one another, are formed. These heat bonded areas are interspersed in the filamentous web and each heat bonded area is located with a predetermined distance. In this regard, the temperature to heat to the filamentous web is preferably within a certain range lower than the melting point of the sheath component. If the temperature is higher than the melting point of the sheath component, an excessive heat bonding takes place in the heat bonded areas, and the heat bonded areas may be holed or broken when the filamentous fleece is heat drawn. Moreover, the obtained nonwoven fabric becomes hard. On the other hand, if the temperature is excessively lower than the melting point of the sheath component, that is, very low exceeding the mentioned temperature range, heat bonding the conjugate filaments one another becomes incomplete, and the conjugate filaments may slip out at the time of heat drawing the filamentous fleece. Moreover, the breaking strength of the obtained nonwoven fabric is insufficient. Consequently, the temperature to heat the filamentous web is preferably in the range of "melting point of the sheath component minus 5° C." to "melting point of the sheath component minus 30° C.".

With regard to the method for applying a heat partially to the filamentous web, either an embossing apparatus comprising an engraved roll and a flat roll or an embossing apparatus comprising a pair of engraved rolls is prepared, and it is performed to apply a pressure to the filamentous web with projections of the heated engraved roll. The projections are interspersed on the surface of the engraved roll surface. In this process, it is preferred that the engraved roll is heated to a temperature within a certain temperature range lower than the melting point of the sheath component as described above. Each individual form of the projections may be circle, ellipse, rhomboid, triangle, T-shape, #-shape, rectangle, etc. It is also preferred to form the heat bonded areas by means of an ultra-sonic bonding apparatus. By applying ultra-sonic waves of the apparatus to predetermined areas of the filamentous web, the sheath components are molten by frictional heat among the conjugate filaments one another.

After obtaining the filamentous fleece in which heat bonded areas are interspersed as described above, the filamentous fleece is extended in cross direction as desired. This extension is preferably carried out under a heating atmosphere, i.e., under an atmosphere of blowing a hot air of 40° to 80° C. This is because the extension may be easily carried out at any desired extension percentage by plasticizing a little the conjugate filaments under such a heating atmosphere. The Extension is preferably carried out with expander rolls or gears like a greed. The percentage of the extension of the filamentous fleece in cross direction is preferably 5 to 50%. If the percentage is less than 5%, weight per square meter of the nonwoven fabric after the heat drawing becomes large, and it is difficult to obtain any nonwoven fabric of light weight per square meter. However, when it is unnecessary to heat-draw the filamentous fleece at large ratio in machine direction, the percentage of the extension may be less than 5%, and there may be a case that any extension is not required. On the other hand, if the percentage of the extension exceeds 50%, there is a possibility of breaking the filamentous fleece. In this regard, the percentage (%) of the extension is expressed by {[(width after extension)−(width before extension)]/width before extension)}×100.

Then, a heat drawing is applied to the extended filamentous fleece in machine direction. The heat drawing may be carried out with any conventional method. For example, the drawing may be carried out between feed rollers and drawing rollers rotating at a circumferential speed higher than the feed rollers. This drawing is also preferably carried out under a heating atmosphere at a lower temperature than the melting point of the sheath component. Preferred modes for the heat drawing are hereinafter described, which are combined with heat setting.

(i) Feed rollers heated from 60° to 80° C. and drawing rollers heated to a higher temperature than that of the feed rollers by 10° to 30° C. may be used for the method of the heat srawing. In this method, the heat drawing is applied when the filamentous fleece is take out of the feed rollers. Then, the heat setting is applied when the filamentous fleece exists into the drawing rollers. In this process, it is preferred to provide a heating area between the feed rollers and the drawing rollers. The heating area is preferably heated to an intermediate temperature between the heating temperature of the feed rollers and that of the drawing rollers. The heating area may be also provided after passing the drawing rollers instead of providing between the feed rollers and the drawing rollers. Any means such as dry heating or wet heating, etc. maybe employed in the heating area as far as the filamentous fleece is heated. More specifically, heating by oven, heating by infrared ray, heating by bringing into contact with a heat plate, etc. may be preferably employed as the dry heating, and passing the filamentous fleece through a hot water or hot steam may be preferably employed as the wet heating.

(ii) It may be used for the method of the heat drawing to employ feed rollers of room-temperature, drawing rollers heated from 70° to 110° C., and a heating area provided between the feed rollers and the drawing rollers and heated to a lower temperature than that of the drawing rollers. In this method, the heat drawing is applied when the filamentous fleece is passing through the drawing rollers. Then, the heat setting is applied when the filamentous fleece exists into the drawing rollers. With regard to the heating area, various means may be employed in the same manner as the foregoing case (i).

(iii) It may be used for the method of the heat drawing to employ feed rollers heated from 60° to 80°C., drawing rollers of room-temperature, and a heating area provided behind the drawing rollers and heated to a higher temperature than that of the feed rollers by 10° to 30° C. In this method, the heat drawing is applied when the filamentous fleece is taken from the feed rollers. Then, the filamentous fleece is introduced into the drawing rollers, and the heat setting is applied when the filamentous fleece is passing through the heating area provided behind. With regard to the heating area, various means may be employed in the same manner as the foregoing case (i).

(iv) It may be used for the method of the heat drawing to employ feed rollers of room-temperature, drawing rollers heated from 70° to 110° C., and a first heating area A provided between the feed rollers and the drawing rollers, and a second heating area B provided behind the drawing rollers. The heating area B is heated to a higher temperature than that of the heating area A. Generally, it is preferred that the temperature of the heating area A is 60° to 80° C., and the temperature of the heating area B is higher than that of the heating area A by 10° to 30° C. In this process, the heat drawing is applied when the filamentous fleece is passing through the heating area A. Then, the filamentous fleece is taken into the drawing rollers, and the heat setting is applied when the filamentous fleece is passing through the heating area B provided behind. With regard to the heating areas A and B, various means may be employed in the same manner as the foregoing case (i).

As a result of the mentioned heat drawing, the sheath component and the core component are plasticized, and the drawing due to shear between the two components is applied to the conjugate filaments. Further, while keeping the heat bonding the filaments one another in the heat bonded areas, the conjugate filaments are rearranged in machine direction, and the molecular orientation in the conjugate filaments forming the filamentous fleece is improved, whereby elasticity in cross direction comes to appear. In the molecular orientation of the conjugate filaments, the molecular orientation of the core component is particularly improved, as a result, the birefringence of the core component is also improved. For example, the birefringence of the core component in the filamentous fleece being about $90 \times 10^{-3}$ before the heat drawing, is improved to be about $115 \times 10^{-3}$ to $140 \times 10^{-3}$ after the heat drawing. In addition, it is a matter of course that the birefringence becomes larger when applying the heat drawing in a larger drawing ratio.

With regard to the scale of the heat drawing, it is required that the drawing ratio is 10 to 80% on the basis of the breaking strength of the filamentous fleece in machine direction and, preferably, about 40 to 75%. In this connection, the drawing ratio means a percentage of elongation on the basis of drawing to the breaking elongation of the filamentous fleece in machine direction. Accordingly, when B % is the breaking elongation of the filamentous fleece in machine direction, the filamentous fleece is elongated in machine direction by $(0.1 \times B$ to $0.8 \times B)$ %. If the drawing ratio is less than 10%, the conjugate filaments in the filamentous fleece is not sufficiently rearranged in machine direction, resulting in insufficient elasticity in cross direction. Moreover, because any sufficient shear is not applied to the conjugate filaments (particularly to the core components), the molecular orientation does not increase and, after all, it is difficult to improve the tensile strength. On the other hand, if the drawing ratio exceeds 80%, the drawing takes place excessively, as a result, the conjugate filaments in the filamentous fleece may be broken. In this regard, the breaking elongation (%) of the filamentous fleece in machine direction was measured in accordance with the method set forth in JIS-L-1096A in the same manner as the aforementioned measurement of the breaking elongation of the nonwoven fabric.

The filamentous fleece after the drawing as described above is then subject to a heat treatment at a lower temperature than the melting point of the sheath component, and a heat setting is carried out. It is preferred that temperature of the heat setting is higher than that employed at the time of drawing to delete the heat history in the drawing. This heat setting may be also carried out in dry heating or wet heating. The heat setting may be carried out under relaxing the filamentous fleece or under stretching it or under keeping it in normal state. It is, however, more preferable that the heat setting is carried out under stretching the filamentous fleece or under keeping it in normal state from the viewpoint of giving a sufficient elasticity to the obtained nonwoven fabric. The heat setting may be also carried out by the method (i) to (iv) described above.

FIG. 1 is a flow diagram showing one manufacturing process of the elastic nonwoven fabric according to the invention. More specifically, the filamentous fleece is obtained by the predetermined method (Step 1), then the filamentous fleece is extended under the heating atmosphere in cross direction (Step 2). The heat drawing is applied to the extended filamentous fleece under the heating atmosphere (Step 3). After the heat drawing, the heat setting is applied (Step 4). If desired, the obtained nonwoven fabric is then wound up to form a roll (Step 5). Generally, each of these steps is carried out continuously on line. It is also preferred to separate Step 1 and Step 2 so that the process for obtaining the filamentous fleece may be carried out separately from the remaining process of extension, drawing and heat setting. In the manufacturing process of the elastic nonwoven fabric according to the invention, percentage of porosity of the obtained elastic nonwoven fabric is generally larger than that of the filamentous fleece, as suggested in the preferred examples described later. This is a phenomenon opposite to the description of U.S. Pat. No. 5,244,482 regarding a drawn nonwoven fabric and is quite unexpected. The reason why such a phenomenon takes place is not always clear, but it is presumed that this phenomenon is a result of using the conjugate filaments each of which is about concentric sheath-core type, employing the filamentous fleece in which the heat bonded areas are interspersed, and carrying out the extension treatment before the heat drawing, if desired. In other words, it is presumed as follows. In the conjugate filaments each of which is about concentric sheath-core type, as the stress, loaded to the core component is different from the stress loaded to the sheath component when the heat drawing is applied, some slack is produced in the conjugate filament, thereby pores are formed or enlarged in the nonwoven fabric, and as there is a substantial difference in the intensity of drawing between the interspersed heat bonded areas and the remaining areas not heat bonded, further pores are formed or enlarged. Moreover, as the pores are preliminarily enlarged by the extension in cross direction before the heat drawing, it is possible to prevent the pores from reducing.

The elastic nonwoven fabric obtained in the manner described above may be applied in various uses, particular in medical or healthy material, as it is, and it is also possible to apply in various uses by laminating an elastic film on the elastic nonwoven material, as shown in FIG. 2. It is further possible in various uses to apply the three layer material which is formed by laminating the elastic films 2, 2 on both sides of the elastic nonwoven fabric 1 or by laminating the elastic nonwoven fabrics 1, 1 on both sides of the elastic film 2. It is a matter of course that use of the elastic nonwoven fabric according to the invention is not limited to the mentioned ones but any other variation or modification may be made without departing the scope of the invention.

The elastic nonwoven fabric according to the invention comprising the conjugate filaments each of which is about concentric sheath-core type, and having the interspersed heat bonded areas each of which is formed by heat bonding the filaments one another by softening or melting the sheath components, further satisfies the following four properties at the same time. They are, (i) breaking elongation of the nonwoven fabric in cross direction is 150% or more; (ii) ratio of breaking elongation of the nonwoven fabric in cross direction to the breaking elongation in machine direction is 5 or more; (iii) percentage of elastic recovery at the time of extending the nonwoven fabric by 50% in cross direction is 60% or more, and (iv) percentage of elastic recovery at the time of extending the nonwoven fabric by 100% in cross direction is 50% or more. Accordingly, an advantage of the invention is uniaxial elasticity, that is, a very large elasticity is exhibited in cross direction, while an elasticity is not substantially exhibited in machine direction. Another advantage of the invention is superior water permeability or liquid permeability on condition that the percentage of porosity of the elastic nonwoven fabric according to the invention is 85% or more.

In the manufacturing process of the elastic nonwoven fabric according to the invention, a filamentous fleece composed of conjugate filaments each of which is about concentric sheath-core type and in which heat bonded areas are interspersed is used, each of the heat bonded areas is formed by heat bonding the conjugate filaments one another by softening or melting the sheath components thereof, and a heat drawing is applied to the filamentous fleece. Accordingly, it is possible to prevent disadvantages which occur to the filamentous fleece composed of filaments of mono-component, that is, one of which is collapse of the heat bonded areas at the time of heat drawing (in the case of heat bonding excessively the filaments of mono-component one another), the other of which is slip of the filaments from the heat bonded areas (in the case of heat bonding insufficiently the filaments of mono-component one another). That is, in the case of the conjugate filaments each of which is about concentric sheath-core type, since the core component remains keeping the filamentous form securely even in the heat bonded areas the heat bonded areas are prevented from being collapsed, and with keeping the core component in the filamentous form securely, the sheath component may be sufficiently softened or molten, therefore the filamentous fleece is prevented from insufficient heat bonding.

In the manufacturing process of the elastic nonwoven fabric according to the invention, since the filamentous fleece is extended in cross direction, if desired, before the heat drawing, there is an advantage such that even when drawing the filamentous fleece in machine direction at a relatively high drawing ratio, the width of the obtained elastic nonwoven fabric is prevented from being excessively shortened and it is also possible to achieve a smaller weight per square meter. Further, the elastic nonwoven fabric obtained by such extension may be naturally stretched up to the width at the time of extending the nonwoven fabric, thereby it is possible to assure high elasticity and high percentage of elastic recovery.

In the manufacturing process of the elastic nonwoven fabric according to the invention, since the heat setting was carried out after the heat drawing, in the conjugate filaments (particularly the core component) sheared at the time of the heat drawing, crystallization is accelerated, resulting in stabilization of the filaments. Accordingly, the conjugate filaments of the filamentous fleece which are rearranged in machine direction at the time of drawing are stabilized in such a rearranged form. As a result, after producing the elastic nonwoven fabric, not only an advantage is exhibited such that dimensional change is less in both machine and cross directions, but also a further advantage is such that the elastic nonwoven fabric is easy to return to the rearranged form from the condition of extending it in cross direction, resulting in superior percentage of elastic recovery.

In the manufacturing process of the elastic nonwoven fabric according to the invention, it is possible to make the percentage of porosity of the elastic nonwoven fabric larger than that of the filamentous fleece. The reason why the percentage of porosity is increased is, as described above, a result of using the conjugate filaments each of which is about concentric sheath-core type, employing the filamentous fleece in which heat bonded areas are interspersed, and carrying out the heat drawing after the extension treatment, if desired. Accordingly, it is possible to obtain an elastic nonwoven fabric of a relatively high percentage of porosity, resulting in superior water permeability or liquid permeability of the elastic nonwoven fabric. Consequently, the elastic nonwoven fabric according to the invention or that obtained by the manufacturing process according to the invention may be preferably used particularly in medical or healthy materials.

DESCRIPTION OF THE PREFERRED EXAMPLES

Figure 1:
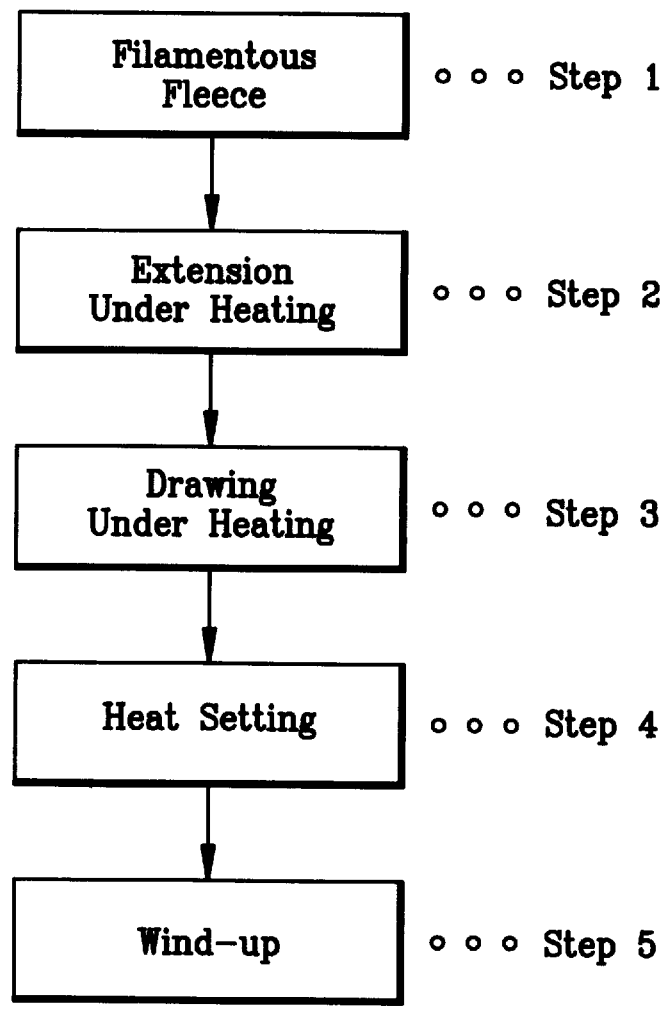
FIG. 1 is a flow diagram showing an embodiment of manufacturing an elastic nonwoven fabric according to the invention.
Figure 2:
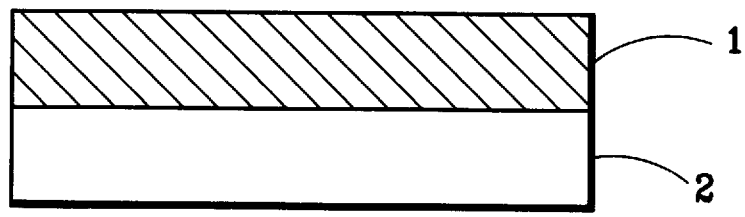
FIG. 2 is a sectional view of a laminated material showing an embodiment of use of the elastic nonwoven fabric according to the invention.

Several preferred examples according to the present invention are hereinafter described specifically, but it is to be noted that the invention is not limited to these examples. Methods for measuring physical property values used in the description of the examples are as follows. The measuring methods of the breaking strength (%), percentage of elastic recovery (%), percentage of porosity (%), percentage of extension (%), tensile strength (kg/5 cm width) and total hand value (g/g/m$^2$) are the same as those described above.

(1) Melting point (° C.): A melting point is a temperature showing a maximum value of melting endothermic curve obtained by a differential calorimeter DSC-2 (produced by Perkin Elmer). A used test piece is 5 mg in weight and the rising speed of a temperature is 20° C./min.

(2) Weight per square meter (g/m$^2$): Ten test pieces each being 10 cm×10 cm were prepared by cutting filamentous material under normal state, and after reaching an equilibrium moisture regain, weight (g) of each test piece was measured, then an average value of the obtained weight values was converted to a value per unit area, and this value was established to be a weight per square meter.

EXAMPLE 1

Polyethyleneterephthalate having 256° C. in melting point and 0.64 in intrinsic viscosity was prepared to be used as a core component. Polyethylene having high density of 130° C. in melting point and 25 g/10 min in melt index value (measured in accordance with the method set forth in ASTM D1238(E)) was prepared to be used as a sheath component. These two polymers were respectively introduced by each extruder into a spinneret provided with holes to spin bi-component filament. In this process, the molten polyethyleneterephthalate was introduced into the core part of the hole to spin bi-component filament, and the molten polyethylene having high density was introduced into the sheath part, whereby the weight ratio between the core part and the sheath part became equal, and conjugate melt spinning was carried out under the condition of 1.5 g/min in emerging weight per hole. Filaments spun out of the spinneret were cooled by the conventional cooling apparatus and drawn out by means of an air sucker provided beneath the spinneret at the drawing speed of 4,500 m/min. Then, the spun filaments were opened by an apparatus provided at the outlet of the air sucker, and accumulated on a moving screen conveyor of wire mesh, whereby a filamentous web of 30 g/m$^2$ in weight per square meter was obtained. Fineness of the conjugate filaments each of which is about concentric sheath-core type forming the filamentous web was about 3 denier on an average.

Then, this filamentous web was introduced between the engraved roll heated to 125° C. and the flat roll heated to 125° C. As the result, areas of the filamentous web in contact with the projections of the engraved roll were partially heated, whereby the sheath components of the conjugate filaments each of which is about concentric sheath-core type were softened or molten, and the conjugate filaments were heat bonded one another. Thus, filamentous fleece in which heat bonded areas were interspersed was obtained. The size of each heat bonded area was 0.6 mm$^2$, and the number of the heat bonded areas in the filamentous fleece was 20 areas/cm$^2$. Total area of the heat bonded areas occupied 15% of the surface area of the filamentous fleece. The breaking elongation of this filamentous fleece in machine direction was 69%. The density of the conjugate filaments forming the filamentous fleece was 1.122 g/cm$^3$, and the percentage of porosity of the filamentous fleece was 84.3%.

This filamentous fleece was then introduced into a pressure steam treatment apparatus provided with clip tenter and extended by 15% in cross direction under the atmosphere of 60° C. Keeping the extended state, a heat drawing was applied to the filamentous fleece in machine direction. One drawing step was applyed as the heat drawing, that is, after introducing into the feed rollers, the filamentous fleece was dipped in a warm bath and further introduced into the drawing rollers. In this process, temperature of the feed rollers was kept at room-temperature, temperature of the warm bath was set to 90° C., temperature of the drawing roller was kept at room-temperature, and the drawing ratio was set to 43.5%. Then, the filamentous fleece after the heat drawing was introduced onto a heat drum of 125° C., thereby heat setting was carried out, and an elastic nonwoven fabric was obtained. Physical properties of this elastic nonwoven fabric is shown in Table 1.

TABLE 1

|  | Example | | | | |
| --- | --- | --- | --- | --- | --- |
|  | 1 | 2 | 3 | 4 | 5 |
| weight per square meter (g/cm$^2$) | 36 | 40 | 45 | 37 | 43 |
| EC (%) | 190 | 280 | 450 | 230 | 400 |
| EC/EM | 5.3 | 10.4 | 35.4 | 5.8 | 22.2 |
| EEC (50)(%) | 74 | 79 | 86 | 68 | 90 |
| EEC (100)(%) | 62 | 71 | 82 | 54 | 86 |
| percentage of porosity (%) | 91.8 | 92.9 | 94.0 | 90.6 | 93.8 |
| value of total hand (g/g/m$^2$) | 1.42 | 1.18 | 0.80 | 0.75 | 1.64 |
| birefringence of filament[1] × 10$^{-3}$ | 121 | 126 | 130 | 118 | 128 |
| tensile strength (machine direction) (kg/5 cm width) | 53.8 | 59.3 | 65.1 | 45.9 | 67.3 |

In Table 1, g/m$^2$ indicates the weight (g) per square meter (1 m$^2$), EC indicates the breaking elongation (%) of the nonwoven fabric in cross direction, EM indicates the breaking elongation (%) of the nonwoven fabric in machine direction, EEC (50) indicates the percentage of elastic recovery (%) at the time of extending the nonwoven fabric by 50% in cross direction, EEC (100) indicates the percentage of elastic recovery (%) at the time of extending the nonwoven fabric by 100% in cross direction, and total hand value indicates the flexibility of the nonwoven fabric.

EXAMPLE 2

An elastic nonwoven fabric was obtained in the same conditions as the foregoing Example 1 except that the drawing ratio was set to 58.0%. Physical properties of this elastic nonwoven fabric is shown in Table 1.

EXAMPLE 3

An elastic nonwoven fabric was obtained in the same conditions as the foregoing Example 1 except that the drawing ratio was set to 72.5%. Physical properties of this elastic nonwoven fabric is shown in Table 1.

EXAMPLE 4

The same polyethyleneterephthalate as the one used in the foregoing Example 1 was prepared to be used as the core component, and the same polyethylene having high density as the one used in the foregoing Example 1 was prepared to be used as the sheath component. These two polymers were subject to conjugate melt spinning in the same manner as the foregoing Example 1 except that the weight ratio between the two components was core component: sheath component=1:2 and that emerging weight per hole was 1.4 g/min. Then, filaments spun out of the spinneret were drawn out in the same manner as the foregoing Example 1 except that the drawing speed was 4,200 m/min. The, same treatment as the foregoing Example 1 was further carried out, whereby a filamentous web having 30 g/m$^2$ in weight per square meter was obtained. Fineness of the conjugate filaments each of which is about concentric sheath-core type forming the filamentous web was about 3 denier on an average.

The filamentous web was then provided with heat bonded areas in the same manner as the foregoing Example 1, thereby a filamentous fleece was prepared. The breaking elongation of this filamentous fleece in machine direction was 58%. The density of the conjugate filaments forming the filamentous fleece was 1.119 g/cm$^3$, and the percentage of porosity of the filamentous fleece was 83.1%. The filamentous fleece was extended on the same conditions as the foregoing Example 1, and the heat drawing and the heat setting were applied to the filamentous fleece on the same conditions as the foregoing Example 1 heat except that the drawing ratio was set to 56.9%. Physical properties of the elastic nonwoven fabric obtained in the mentioned manner were as shown in Table 1.

EXAMPLE 5

The same polyethyleneterephthalate as the one used in the foregoing Example 1 was prepared to be used as the core component, and the same polyethylene having high density as the one used in the foregoing Example 1 was prepared to be used as the sheath component. These two polymers were subject to conjugate melt spinning in the same manner as the foregoing Example 1 except that the weight ratio between the two components was core component: sheath component=1:0.5 and that the emerging weight per hole was 1.57 g/min. Then, filaments spun out of the spinneret were drawn out in the same manner as the foregoing Example 1 except that the drawing speed was 4,700 m/min. The same treatment as the foregoing Example 1 was further carried out, whereby a filamentous web having 30 g/m$^2$ in weight per square meter was obtained. Fineness of the conjugate filaments each of which is about concentric sheath-core type forming the filamentous web was about 3 denier on an average.

The filamentous web was then provided with heat bonded areas in the same manner as the foregoing Example 1, thereby a filamentous fleece was prepared. The reaking elongation of this filamentous fleece in machine direction was 82%. The density of the conjugate filaments forming the filamentous fleece was 1.124 g/cm$^3$, and the percentage of porosity of the filamentous fleece was 85.5%. The filamentous fleece was extended on the same conditions as the foregoing Example 1, and the heat drawing and the heat setting were applied to the filamentous fleece on the same conditions as the foregoing Example 1 heat except that the temperature of the feed rollers was set to 75° C., the temperature of the warm bath was set to 95° C., the temperature of the drawing rollers was set to 100° C., and the drawing ratio was set to 57.3%. Physical properties of the elastic nonwoven fabric obtained in the mentioned manner were as shown in Table 1.

EXAMPLE 6

The same polyethyleneterephthalate as the one used in the foregoing Example 1 was prepared to be used as the core component. And a polypropylene having 160° C. in melting point and 30 g/10 min in melt flow rate (measured in accordance with the method set forth in ASTM D1238(L)) was prepared to be used as the sheath component. These two polymers were subject to conjugate melt spinning in the same manner as the foregoing Example 1 except that the emerging weight per hole was 1.37 g/min. Then, filaments spun out of the spinneret were drawn out in the same manner as the foregoing Example 1 except that the drawing speed was 4,100 m/min. The same treatment as the foregoing Example 1 was further carried out, whereby a filamentous web having 30 g/m² in weight per square meter was obtained. Fineness of the conjugate filaments each of which is about concentric sheath-core type forming the filamentous web was about 3 denier on an average.

The filamentous web was then provided with heat bonded areas in the same manner as the foregoing Example 1 except that the temperature of the engraved roll and the flat roll was set to 145° C., thereby a filamentous fleece was prepared. The breaking elongation of this filamentous fleece in machine direction was 75%. The density of the conjugate filaments forming the filamentous fleece was 1.080 g/cm³, and the percentage of porosity of the filamentous fleece was 81.2%. The filamentous fleece was extended on the same conditions as the foregoing Example 1. Then, keeping the extended state, the heat drawing was applied to the filamentous fleece on the same conditions as the foregoing Example 1 heat except that the temperature of the feed roller was set to 95° C., the temperature of the warm bath was set to 98° C., the temperature of the drawing roller was set to 135° C., and the drawing ratio was set to 57.3%. Thereafter, a heat setting was applied to the filamentous fleece on the same conditions as Example 1 except that the temperature of the heat treatment ratio was set to 150° C. Physical properties of the elastic nonwoven fabric obtained in the mentioned manner were as shown in Table 2.

TABLE 2

|  | Example | | Comparative Example | |
| --- | --- | --- | --- | --- |
|  | 6 | 7 | 1 | 2 |
| weight per square meter (g/cm²) | 42 | 53 | 40 | 32 |
| EC (%) | 330 | 480 | 70 | 98 |
| EC/EM | 10.7 | 40.6 | 1.0 | 1.3 |
| EEC (50)(%) | 74 | 90 | 23 | 26 |
| EEC (100)(%) | 68 | 85 | — | — |
| percentage of porosity (%) | 88.9 | 90.2 | 84.3 | 83.1 |
| value of total hand (g/g/m²) | 1.05 | 1.22 | 2.83 | 2.41 |
| birefringence of filament[1] × 10⁻³ | 116 | 120 | 92 | — |
| tensile strength (machine direction) (kg/5 cm width) | 62.0 | 52.6 | 38.8 | 25.6 |

In Table 2, the same items as Table 1 are shown.

EXAMPLE 7

An elastic nonwoven fabric was obtained in the same conditions as the foregoing Example 1 except that the filamentous fleece was not extended at all (i.e., the percentage of extension was 0%) in cross direction. Physical properties of this elastic nonwoven fabric is shown in Table 2.

COMPARATIVE EXAMPLE 1

An elastic nonwoven fabric was obtained in the same conditions as the foregoing Example 1 except that weight per square meter of the filamentous web was set to 40 g/m² and any extension, heat drawing and heat setting were not applied. Physical properties of this elastic nonwoven fabric is shown in Table 2.

COMPARATIVE EXAMPLE 2

The same polypropylene as the one used in Example 6 was prepared. By using an extruder, the polypropylene was supplied to the spinneret provided with a spinning hole for forming a circular cross-section filament of mono-component, and a melt spinning was carried out under the condition that the emerging weight per hole was 1.27 g/min. Spun filaments were drawn out in the same manner as the foregoing Example 6 except that the drawing speed was set to 3,800 m/min. The same treatment as Example 6 was further carried out, whereby a filamentous web having 30 g/m² in weight per square meter was obtained. Fineness of the circular cross-section filament of mono-component forming the filamentous web was about 3 denier on an average.

The filamentous web was then provided with heat bonded areas in the same manner as Example 6, thereby a filamentous fleece was prepared. The breaking elongation of this filamentous fleece in machine direction was 80%. The density of the polypropylene circle cross-section filament of mono-component forming the filamentous fleece was 0.86 g/cm³, and the percentage of porosity of the filamentous fleece was 73.9%. The filamentous fleece was extended on the same conditions as Example 6, and the heat drawing and the heat setting were applied to the filamentous fleece on at the same conditions as Example 6 except that the drawing ratio was set to 57.5%. Physical properties of the nonwoven fabric obtained in the mentioned manner were as shown in Table 2.

It is obviously understood from Table 1 and Table 2 that all of the elastic nonwoven fabric obtained through the process according to Examples 1 to 3 have a superior elasticity in cross direction. When increasing the ratio of drawing more, the elasticity in cross direction becomes larger, and the percentage of elastic recovery becomes also larger. In the process according to Example 4, since quantitative ratio of polyethylene being the sheath components of the conjugate filaments was increased, the obtained elastic nonwoven fabric was inferior in the elasticity and the percentage of elastic recovery but superior in the flexibility, as compared with the elastic nonwoven fabrics according to Examples 1 to 3. In the process according to Example 5, since quantitative ratio of polyethyleneterephthalete being the core component of the conjugate filaments was increased, the obtained elastic nonwoven fabric was inferior in the flexibility but superior in the elasticity and the percentage of elastic recovery, as compared with the elastic nonwoven fabrics according to Examples 1 to 3. In the process according to Example 6, since polypropylene was used as the core component of the conjugate filaments, the obtained elastic nonwoven fabric was inferior in the flexibility but superior in the elasticity and the percentage of elastic recovery. In the process according to Example 7, since the filamentous fleece was subject to heat drawing without extending it in cross direction, the obtained elastic nonwoven fabric was inferior a little in stretchability in cross direction but satisfactory in the elasticity and the percentage of elastic recovery. In the process according to Comparative Example 1, since any heat drawing and heat setting were not applied, the obtained nonwoven fabric was poor in the elasticity and the percentage of elastic recovery, which was far from the elastic nonwoven fabric. In the process according to Comparative Example 2, since the mono-component filaments were used instead of conjugate filaments, and the mono-component filaments were slipped out from the heat bonded areas at the time of heat drawing, it may be understood by the fact that weight per square meter was small as compared with Examples 1 to 7. Furthermore, the heat setting of the filaments was insufficient. As a result, the obtained nonwoven fabric was inferior in both the elasticity and the percentage of elastic recovery, which was far from the elastic nonwoven fabric. Further, it is clearly understood from Table 1 and Table 2 that the percentage of porosity of each elastic nonwoven fabric obtained by the process according to Examples 1 to 7 is larger than that of the filamentous fleece before extension and drawing.

What is claimed is:

1. A uniaxially elastic nonwoven fabric comprising accumulated conjugate filaments each of which is about concentric sheath-core type being composed of a polyester core component and a polyolefine sheath component having lower melting point than that of said polyester core component, and heat bonded areas being interspersed by heat bonding said conjugate filaments one another by softening or melting said sheath component; wherein following expressions (1) to (4) are concurrently satisfied:

$$EC \geq 150\% \qquad (1)$$

$$EC/EM \geq 5 \qquad (2)$$

$$EEC(50) \geq 60\% \qquad (3)$$

$$EEC(100) \geq 50\% \qquad (4)$$

where: EC indicates a breaking elongation of said nonwoven fabric in cross direction, EM indicates a breaking elongation of said nonwoven fabric in machine direction, EEC(50) indicates a percentage of elastic recovery at the time of extending said nonwoven fabric by 50% in cross direction, and EEC(100) indicates a percentage of elastic recovery at the time of extending said nonwoven fabric by 100% in cross direction.

2. A uniaxially elastic nonwoven fabric as set forth in claim 1, wherein fineness of said conjugate filaments is 15 denier or less, and weight ratio between the core component and the sheath component of said conjugate filaments is core component 1:sheath component 0.1 to 5.

3. A uniaxially elastic nonwoven fabric as set forth in claim 1, wherein percentage of porosity is 85% or more.

4. A manufacturing process of a uniaxially elastic nonwoven fabric comprising the steps of: forming a filamentous web by accumulating conjugate filaments on a collecting conveyor being composed of a polyester core component and a polyolefine sheath component having lower melting point than that of said polyester core component; applying a heat partially to said filamentous web, thereby obtaining a filamentous fleece in which heat bonded areas, formed by heat bonding said conjugate filaments by softening or melting said sheath component, are interspersed; applying a heat drawing to said filamentous fleece at a drawing ratio of 10 to 80% in machine direction while extending said filamentous fleece in cross direction at a percentage of extension of 0 to 50%; and applying a heat setting to said filamentous fleece at a temperature lower than melting point of said sheath component.

5. A manufacturing process of a uniaxially elastic nonwoven fabric as set forth in claim 4, wherein the percentage of extension of the filamentous fleece in cross direction is 5 to 50%.

6. A manufacturing process of a uniaxially elastic nonwoven fabric as set forth in claim 4, wherein percentage of porosity of the elastic nonwoven fabric is larger than that of the filamentous fleece.

7. A manufacturing process of a uniaxially elastic nonwoven fabric as set forth in claim 5, wherein percentage of porosity of the elastic nonwoven fabric is larger than that of the filamentous fleece.

* * * * *